United States Patent [19]

Ibusuki et al.

[11] Patent Number: 4,966,665

[45] Date of Patent: Oct. 30, 1990

[54] METHOD FOR PHOTOCHEMICAL DECOMPOSITION OF VOLATILE ORGANIC CHLORINE COMPOUND IN VENT GAS

[75] Inventors: Takashi Ibusuki, Tsukuba; Keigo Nakamura, Toda; Schuzou Kutsuna, Tsukuba, all of Japan

[73] Assignee: Agency of Industrial Science and Technology, Tokyo, Japan

[21] Appl. No.: 422,494

[22] Filed: Oct. 17, 1989

[30] Foreign Application Priority Data

Oct. 18, 1988 [JP] Japan .................................. 63-262176

[51] Int. Cl.$^5$ .............................................. B01J 19/08
[52] U.S. Cl. .............................. 204/157.3; 204/157.94; 204/158.21
[58] Field of Search ........... 204/157.3, 157.94, 158.11, 204/158.12, 158.21

[56] References Cited

U.S. PATENT DOCUMENTS

| | | | |
|---|---|---|---|
| 4,144,152 | 3/1979 | Kitchens | 204/157.94 |
| 4,780,287 | 10/1988 | Zeff | 204/158.21 |
| 4,806,514 | 2/1989 | Langford | 204/158.21 |

FOREIGN PATENT DOCUMENTS

| | | | |
|---|---|---|---|
| 1070641 | 1/1980 | Canada | 204/157.3 |
| 2814126A1 | 10/1979 | Fed. Rep. of Germany | 204/158.21 |
| 62-191025 | 8/1987 | Japan | 204/157.3 |

OTHER PUBLICATIONS

Childs, Diss. Abstr. Int. B 1981, 41(11), 4195.

*Primary Examiner*—T. Tung
*Assistant Examiner*—Ben C. Hsing
*Attorney, Agent, or Firm*—Wenderoth, Lind & Ponack

[57] ABSTRACT

A volatile chlorine-containing organic compound, e.g., trichloroethylene and tetrachloroethylene, contained in a vent gas as a pollutant of atmospheric air can be rapidly and efficiently decomposed into less harmful decomposition products by irradiating the vent gas with ultraviolet light having a wavelength of 400 nm or shorter while the vent gas is in contact with a titanium dioxide powder, for example, supported on the wall of a reactor through which the vent gas is passed.

3 Claims, No Drawings

METHOD FOR PHOTOCHEMICAL DECOMPOSITION OF VOLATILE ORGANIC CHLORINE COMPOUND IN VENT GAS

BACKGROUND OF THE INVENTION

The present invention relates to a method for the photochemical decomposition of a volatile chlorine-containing organic compound in a vent gas. More particularly, the invention relates to a method for the photochemical decomposition of a volatile chlorine-containing organic compound, such as trichloroethylene and tetrachloroethylene, contained in a vent gas or exhaust air, which may cause a serious problem of environmental pollution.

Volatile organic chlorine compounds such as trichloroethylene and tetrachloroethylene are used in large quantities as a degreasing solvent in dry cleaning and washing solvent in various processes of metal-working and semiconductor industries. These organic chlorine compounds are notoriously carcinogenic so that one of the most serious problems in respect of environmental pollution in recent years is the contamination of atmospheric air and drinking water by these compounds as the contaminant or pollutant. Despite the utmost care in the above mentioned industrial processes for preventing dissipation of these compounds, namely, it is almost unavoidable that a considerable amount of these chlorine compounds employed in the process is emitted to the environmental atmosphere due to their high volatility. Moreover, the purifying processes of water for city water supply or for in-plant utility and sawage disposal sometimes involve a step of aeration of the raw or waste water so that, when the water under aeration is contaminated with these volatile organic chlorine compounds, the volatile compounds are readily transferred into the vent air. Therefore, such a vent air or gas must be discharged out of the site after removing or decomposing the volatile organic chlorine compounds into a harmless or less harmful form.

Various proposals and attempts have been made in the prior art for removing or decomposing such a volatile organic chlorine compound contained in a vent gas, mainly, by using an adsorbent. For example, Japanese Patent Kokai No. 62-163730 proposes a method in which a plural number of adsorption columns are installed and run in an alternately cycling steps of adsorption of the chlorine compounds on the adsorbent and regeneration of the saturated adsorbent while the vent gas containing the volatile organic chlorine compounds is under ultraviolet irradiation with a germicidal and ozone-generating light. Further, Japanese Patent Kokai No. 61-153190 proposes use of a modified synthetic zeolite as the adsorbent.

Though relatively reliable, the above mentioned adsorption methods have problems and disadvantages in respect of the limited adsorption capacity of the adsorbent or, in particular, extremely low adsorption capacity of the adsorbent for a constituent contained in the vent gas in a low concentration and troublesome running procedure of the process including a treatment for the regeneration of the adsorbent. Moreover, the irradiation with an ozone-generating ultraviolet light is economically disadvantageous due to the high cost for the lamps.

SUMMARY OF THE INVENTION

The present invention accordingly has an object to provide a method for decreasing the concentration of the volatile chlorine-containing organic compounds such as trichloroethylene and tetrachloroethylene in a vent gas or air by photochemically decomposing the chlorine compound into less harmful decomposition products without the above described problems and disadvantages in the prior art methods.

Thus, the method of the present invention for the photochemical decomposition of a volatile chlorine-containing organic compound contained in a vent gas comprises: bringing the vent gas containing the volatile chlorine-containing organic compound into contact with titanium dioxide and irradiating the vent gas at the interface with the titanium dioxide with light of a wavelength shorter than 400 nm.

DETAILED DESCRIPTION OF THE PREFERRED EMBODIMENTS

As is described above, the inventive method is characterized by the ultraviolet irradiation of a chlorine compound-containing vent gas in contact with a titanium dioxide powder which catalytically promotes the photochemical decomposition of the chlorine-containing organic compound. This inventive method, which has been established as a result of the extensive investigations undertaken by the inventor on the photochemical reaction of volatile chlorine-containing organic compounds in the presence of a metal oxide, is so effective that the photochemical reaction can proceed rapidly at a relatively low temperature of, for example, room temperature to decompose the chlorine compounds into less harmful decomposition products at such a relatively high velocity that the principle can be used as a practical method for decreasing the concentration of the chlorine-containing organic compound in a vent gas from various processes. According to the inventive method, for example, trichloroethylene or tetrachloroethylene contained in air can be decomposed nearly completely into less harmful or more easily disposable compounds such as carbon dioxide, carbon monoxide, hydrogen chloride, chlorine and the like with a minor portion converted into phosgene and carbon tetrachloride. These toxic gaseous decomposition products can be easily removed from the vent air by a known method such as absorption in or scrubbing with an aqueous alkaline solution.

According to the inventive method, the volatile chlorine-containing organic compound can be rapidly decomposed with a high efficiency even when the concentration thereof in the vent gas is so low as not to ensure efficient adsorption by any adsorbent materials. In addition, the catalytic activity of the titanium dioxide powder for the photochemical decomposition is very durable and safe from gradual decrease in a continued running. The troublesome and time consuming step of regeneration of the adsorbent indispensable in the prior art adsorption method is of no use in the inventive method. Further, the source of the ultraviolet light can be a conventional and inexpensive lamp provided that the lamp emits a light in a wavelengt of 400 nm or shorter so that natural sun light or so-called black light lamps emitting light mainly at a wavelength of 360 nm can be used satisfactorily and the costs for the expensive ozone-generating lamps in the prior art can be saved.

The method of the present invention is applicable to various kinds of chlorine-containing organic compounds including trichloroethylene, tetrachloroethylene, dichloroethanes, vinyl chloride, carbon tetrachloride and the like. It is important that the vent gas containing the chlorine-containing organic compound also contains a substantial amount of oxygenating gas such as oxygen in order that the photochemical reaction can proceed smoothly. The decomposition products of the chlorine-containing organic compound according to the inventive method include carbon dioxide, carbon monoxide, carbon tetrachloride, phosgene, hydrogen chloride and the like. Hydrogen chloride is more or less produced even when the chlorine-containing organic compound to be decomposed has no hydrogen atoms since the vent gas always contains moisture.

In a preferable embodiment for practicing the inventive method, the photochemical reactor is a duplex tube made from a glass having transparency to ultraviolet light, such as fused quartz glass and high-silica glass, and constructed of a core tube and a jacket tube connected in concentric disposition with an annular space between the outer surface of the core and the inner surface of the jacket. The titanium dioxide in a powdery form is applied to the outer surface of the core. It is preferable that the surface of the core tube is provided over a certain length or area with a layer of a semi-sintered glass frit in order to increase the capacity of the surface for holding the titanium dioxide powder since the efficiency of the method largely depends on the contacting area of the vent gas and the titanium dioxide powder. The space between the core and jacket tubes serves as a path for the flowing vent gas under treatment. The ultraviolet lamp or lamps should be installed outside the jacket tube so that the gas under treatment and the titanium dioxide layer are irradiated with ultraviolet light at the interface through the wall of the jacket tube. The intensity of the ultraviolet light reaching the interface is not particularly limitative depending on the desired velocity of the photochemical reaction. For example, quite satisfactory results can usually be obtained with an intensity of the light with $K_o$ of at least 0.05 minute$^{-1}$ calculated as the photochemical dissociation constant of nitrogen dioxide $NO_2$ although the intensity of the light should desirably be as high as possible.

In the following, the method of the present invention is described in more detail by way of examples.

EXAMPLE 1.

A duplex tubular reactor of high-silica glass was constructed of a core tube having an outer diameter of 20 mm and a jacket tube having an inner diameter of 35 mm and wall thickness of 3 mm in a concentric disposition. The outer surface of the core tube was provided over a length of 40 cm or an area of 250 cm$^2$ with a layer of sintered glass frit and the surface was smeared with 1.3 g of a titanium dioxide powder (Titanium Oxide P25, a product by Nippon Aerosil Co.) as a catalyst by evenly spreading thereover. The reaction zone, i.e. the annular space formed between the titanium dioxide-coated surface of the core tube and the inner wall of the jacket tube, had a volume of 260 ml. Two black light lamps each having an output of 60 watts and a length of 120 cm were vertically held just outside the jacket tube at radially opposite positions of the reactor. The ultraviolet light reaching the reaction zone had an intensity of $K_o$=0.05 minute$^{-1}$ calculated as the photochemical dissociation constant of nitrogen dioxide.

As a simulating vent gas, air containing 30 ppm by volume of trichloroethylene was introduced into and passed through the reaction zone at a temperature of 35° C. under irradiation with the black light lamps at a varied flow rate corresponding to a contacting time of the flowing air and the catalytic surface of 13 seconds, 19 seconds or 26 seconds. The contacting time here implied is the time taken for introducing 260 ml of the air into the reactor. When a stationary state had been established, the outflow of the air was analyzed for the contents of undecomposed trichloroethylene, carbon dioxide, carbon monoxide, phosgene and carbon tetrachloride to give the results shown in Table 1 below. These results indicate that the decomposition of the trichloroethylene by the inventive method can be increased by increasing the contacting time of the vent air with the catalytic surface. The catalytic activity of the catalytic surface was very durable showing no substantial decrease even after a continued running test for more than 100 hours. When the ultraviolet lamps were out, no decomposition of trichloroethylene took place even by extending the contacting time. Further, no decomposition of trichloroethylene took place at all even under irradiation with the ultraviolet lamps when no titanium dioxide powder was held on the outer surface of the core tube of the reactor.

TABLE 1

| Contacting time, seconds | Concentration in outflow air, ppm | | | | | Trichloroethylene decomposed, % |
|---|---|---|---|---|---|---|
| | $C_2HCl_3$ | $CO_2$ | CO | $COCl_2$ | $CCl_4$ | |
| 13 | 11 | 13 | 3 | 3 | 1 | 63 |
| 19 | 7 | 17 | 7 | 3 | 1 | 77 |
| 26 | 3 | 20 | 9 | 4 | 1 | 90 |

EXAMPLE 2.

The experimental procedure was substantially the same as in Example 1 except that the flow rate of the air was always constant to give a contacting time of 19 seconds and, instead, the concentration of the trichloroethylene in the air was varied in the range from 10 to 30 ppm. The results are shown in Table 2 below. As is clear from these results, the effectiveness of the inventive method is rather increased when the concentration of the trichloroethylene in the air is decreased. This fact makes a great contrast to the conventional adsorption method in which the efficiency of adsorption is unavoidably decreased when the concentration of the adsorbate in the vent air is decreased.

TABLE 2

| Concentration of trichloroethylene in feed air, ppm | Concentration in outflow air, ppm | | | | | Trichloroethylene decomposed, % |
|---|---|---|---|---|---|---|
| | $C_2HCl_3$ | $CO_2$ | CO | $COCl_2$ | $CCl_4$ | |
| 10 | 1 | 9 | 3 | 1 | 0 | 90 |
| 20 | 4 | 14 | 5 | 2 | 0 | 80 |
| 30 | 7 | 17 | 7 | 3 | 1 | 77 |

EXAMPLE 3.

The experimental procedure was substantially the same as in Example 1 excepting replacement of the trichloroethylene with tetrachloroethylene. The results are shown in Table 3 below. It is clear that the inventive method is equally effective for tetrachloroethylene as well as for trichloroethylene. The durability of the catalytic activity of the catalytic surface was also quite satisfactory. No decomposition of tetrachloroethylene could proceed when the black light lamps were out even by extending the contacting time or when no titanium dioxide powder was held on the outer surface of the core tube of the reactor.

TABLE 3

| Contacting time, seconds | Concentration in outflow air, ppm | | | | | Tetrachloroethylene decomposed, % |
|---|---|---|---|---|---|---|
| | $C_2HCl_3$ | $CO_2$ | CO | $COCl_2$ | $CCl_4$ | |
| 13 | 12 | 14 | 0 | 5 | 1 | 60 |
| 19 | 7 | 18 | 0 | 6 | 1 | 77 |

TABLE 3-continued

| Contacting time, seconds | Concentration in outflow air, ppm | | | | | Tetrachloroethylene decomposed, % |
|---|---|---|---|---|---|---|
| | $C_2HCl_3$ | $CO_2$ | CO | $COCl_2$ | $CCl_4$ | |
| 26 | 3 | 22 | 0 | 9 | 1 | 90 |

What is claimed is:

1. A method for photochemical decomposition of a volatile chlorine-containing organic compound contained in a vent gas which comprises:
   bringing the vent gas containing the volatile chlorine-containing organic compound into contact with titanium dioxide and irradiating the vent gas at the interface with the titanium dioxide with light of a wavelength of 400 nm or shorter.

2. The method as claimed in claim 1 wherein the light for the irradiation of the vent gas has an intensity of at least 0.05 minute$^{-1}$ of the $K_o$ value calculated as a photochemical dissociation constant of nitrogen dioxide.

3. The method as claimed in claim 1 wherein the titanium dioxide powder is supported on the wall of a reactor through which the vent gas is passed.

* * * * *